US009762995B2

United States Patent
Lim et al.

(10) Patent No.: US 9,762,995 B2
(45) Date of Patent: Sep. 12, 2017

(54) STOCHASTIC TRANSMISSION/RECEPTION METHOD AND APPARATUS FOR MU-MIMO SCHEME IN MIMO RADIO COMMUNICATION SYSTEM

(71) Applicant: Samsung Electronics Co., Ltd., Suwon-si, Gyeonggi-do (KR)

(72) Inventors: Jonghan Lim, Seoul (KR); Heunchul Lee, Pocheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 58 days.

(21) Appl. No.: 14/514,872

(22) Filed: Oct. 15, 2014

(65) Prior Publication Data

US 2015/0103686 A1    Apr. 16, 2015

Related U.S. Application Data

(60) Provisional application No. 61/891,542, filed on Oct. 16, 2013.

(30) Foreign Application Priority Data

Sep. 16, 2014 (KR) ........................ 10-2014-0122600

(51) Int. Cl.
*H04L 27/00* (2006.01)
*H04R 1/32* (2006.01)

(52) U.S. Cl.
CPC ......... *H04R 1/323* (2013.01); *H04R 2201/40* (2013.01)

(58) Field of Classification Search
CPC .. H04B 7/0626; H04B 7/0639; H04B 7/0417; H04B 7/024; H04B 7/0632; H04B 7/0469; H04B 17/309; H04L 1/0026; H04L 25/03343; H04L 5/0007; H04L 27/2601; H04L 2025/03426
(Continued)

(56) References Cited

U.S. PATENT DOCUMENTS 6,067,290 A     5/2000 Paulraj et al.
2007/0286310 A1   12/2007 Fukuoka et al.
(Continued)

FOREIGN PATENT DOCUMENTS

EP      2187533 A1    5/2010
KR   10-2011-0111855 A   10/2011
KR   10-2013-0070560 A    6/2013

OTHER PUBLICATIONS

Hakjea Sung et al., Generalized Channel Inversion Methods for Multiuser MIMO Systems, IEEE Transactions on Communications, Nov. 2009, pp. 3489-3499, vol. 57, No. 11.

*Primary Examiner* — Sai Aung
(74) *Attorney, Agent, or Firm* — Jefferson IP Law, LLP

(57) ABSTRACT

A stochastic channel state information transmission/reception method and apparatus is provided for use in a multiuser radio communication system. The signal method of transmitting and receiving signals in a terminal in a mobile communication system according to the present disclosure includes receiving a reference signal transmitted by a base station, estimating channel information based on the reference signal, predicting a channel estimation error based on the channel information, generating feedback information based on the channel estimation error, and transmitting feedback information to the base station.

20 Claims, 7 Drawing Sheets

(58) Field of Classification Search
USPC .................................. 370/252, 329, 328
See application file for complete search history.

(56) References Cited

U.S. PATENT DOCUMENTS

| | | | |
|---|---|---|---|
| 2010/0232525 A1* | 9/2010 | Xia | H04B 7/0626 375/259 |
| 2011/0103493 A1* | 5/2011 | Xia | H04B 7/0632 375/259 |
| 2011/0150114 A1* | 6/2011 | Miao | H04B 7/0417 375/260 |
| 2011/0237282 A1* | 9/2011 | Geirhofer | H04B 7/024 455/509 |
| 2011/0244847 A1* | 10/2011 | Mallik | H04B 7/024 455/422.1 |
| 2013/0028068 A1 | 1/2013 | Park et al. | |
| 2013/0156120 A1 | 6/2013 | Josiam et al. | |
| 2013/0194940 A1 | 8/2013 | Li et al. | |
| 2013/0201912 A1* | 8/2013 | Sheng | H04B 7/0413 370/328 |
| 2013/0202059 A1 | 8/2013 | Kim et al. | |
| 2013/0235818 A1 | 9/2013 | Yuan et al. | |
| 2015/0030092 A1* | 1/2015 | Krishnamurthy | H04B 7/0456 375/267 |

\* cited by examiner

STOCHASTIC TRANSMISSION/RECEPTION METHOD AND APPARATUS FOR MU-MIMO SCHEME IN MIMO RADIO COMMUNICATION SYSTEM

CROSS-REFERENCE TO RELATED APPLICATION(S)

This application claims the benefit under 35 U.S.C. §119 (e) of a U.S. Provisional application filed on Oct. 16, 2013 in the U.S. Patent and Trademark Office and assigned Ser. No. 61/891,542, and under 35 U.S.C. §119(a) of a Korean patent application filed on Sep. 16, 2014 in the Korean Intellectual Property Office and assigned Serial number 10-2014-0122600, the entire disclosure of each of which is hereby incorporated by reference.

TECHNICAL FIELD

The present disclosure relates to a multiple antenna multiuser radio communication system. More particularly, the present disclosure relates to a stochastic channel state information transmission/reception method and apparatus for use in a multiuser radio communication system.

BACKGROUND

Mobile communication systems were developed to provide mobile users with communication services. With the rapid advance of technologies, the mobile communication systems have evolved to the level capable of providing high speed data communication service.

Recently, standardization for a Long Term Evolution (LTE) system, as one of the next-generation mobile communication systems, is underway in the 3rd Generation Partnership Project (3GPP). LTE is designed to provide high speed packet-based communication of up to 100 Mbps and aims at commercial deployment around 2010 timeframe. In order to accomplish the aim, two schemes are being considered: one scheme for reducing the number of nodes located in a communication path by simplifying a configuration of the network, and another scheme for maximally approximating wireless protocols to wireless channels.

Meanwhile, unlike voice service, data service is provided according to the data amount to be transmitted and channel condition. Accordingly, the wireless communication system, especially cellular communication, is provided with a scheduler that manages transmission resource allocation in consideration of the required resource amount, channel condition, data amount, etc. Thus, in an the LTE system, and scheduler located at the base station manages the transmission resource allocation.

In such radio communication systems, a User Equipment (UE) measures the channels from a Base Station (BS) and reports the estimated channel information for use in scheduling, precoding, and modulation to improve communication performance. There is therefore a need of a channel information exchange method and apparatus for providing effective communication environment.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a signal transmission method and apparatus embodied in such a way that a UE generates the feedback information in consideration of stochastic information on the channel estimation error for use by the Base Station (BS) in a multi-antenna multiuser radio communication system.

Another aspect of the present disclosure is to provide a method and apparatus for transmission of feedback channel information based on the channel estimation error prediction of the User Equipment (UE) in the multi-antenna multiuser radio communication system.

Another aspect of the present disclosure is to provide a stochastic precoding design and stochastic user selection method and BS based on the feedback channel information received from the user in a multi-antenna multiuser radio communication system.

In accordance with an aspect of the present disclosure, a method of transmitting and receiving signals in a terminal in a mobile communication system is provided. The method includes receiving a reference signal transmitted by a base station, estimating channel information based on the reference signal, predicting channel estimation error based on the channel information, generating feedback information based on the channel estimation error, and transmitting the feedback information generated to the base station.

In accordance with another aspect of the present disclosure, a method of transmitting and receiving signals in a base station in a mobile communication system is provided. The method includes transmitting a reference signal to a terminal and receiving feedback information generated based on the reference signal from the terminal, wherein the feedback information is generated by the terminal based on a channel estimation error corresponding to the reference signal.

In accordance with another aspect of the present disclosure, a terminal in a mobile communication system is provided. The terminal includes a transceiver configured to transmit and receive signals to and from a base station and a controller configured to control the transceiver to receive a reference signal from the base station, to estimate channel information based on the reference signal, to predict a channel estimation error based on the channel information, to generate feedback information based on the channel estimation error, and to control the transceiver to transmit the feedback information to the base station.

In accordance with still another aspect of the present disclosure, a base station in a mobile communication system is provided. The base station includes a transceiver configured to transmit and receive signals to and from a terminal and a controller configured to control the transceiver to transmit a reference signal to the terminal and receive feedback information generated based on the reference signal from the terminal, wherein the feedback information is generated by the terminal based on a channel estimation error corresponding to the reference signal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
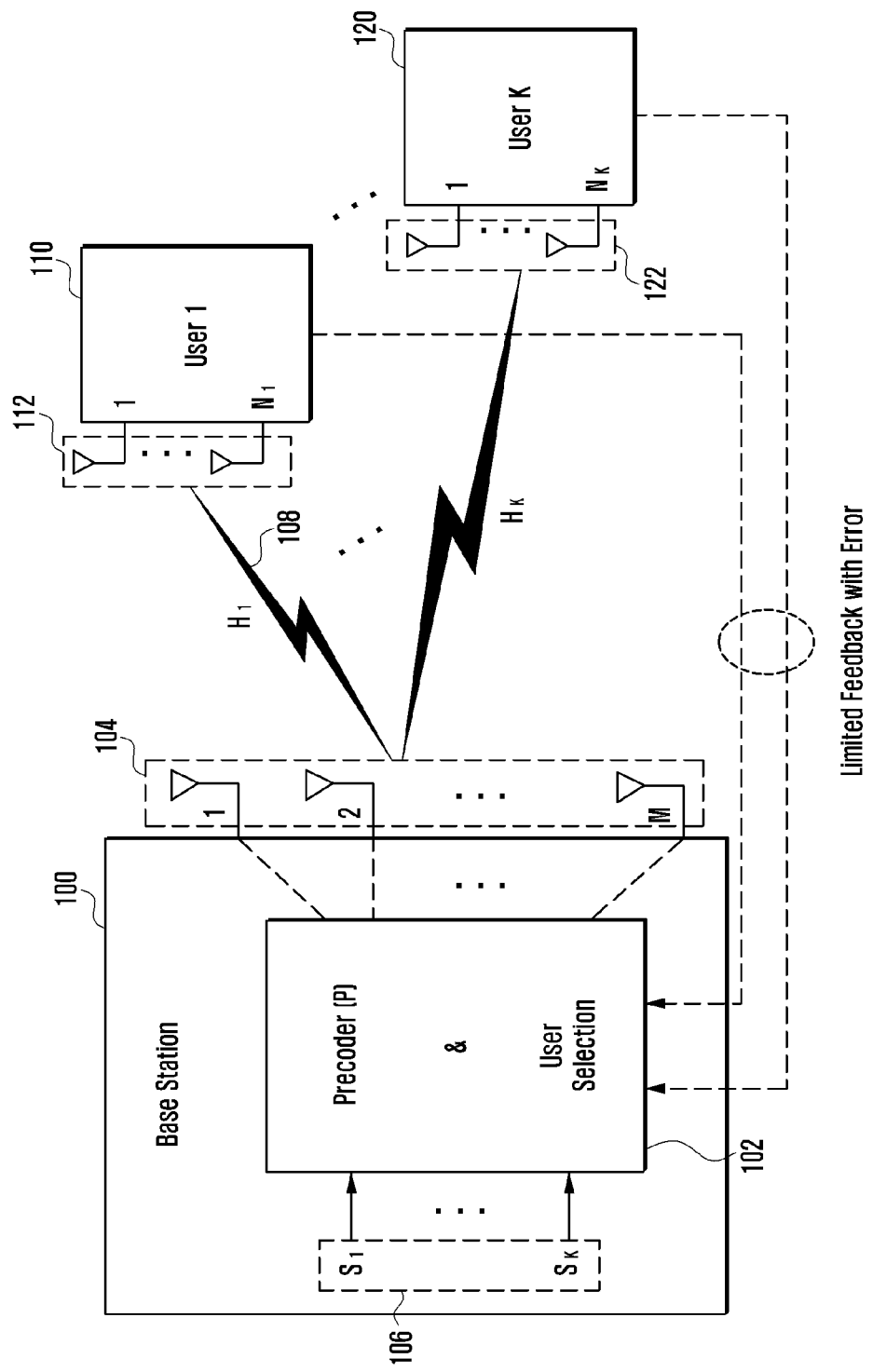
FIG. 1 is a diagram illustrating a system model of a radio communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Advantages and features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like reference numerals refer to like elements throughout the specification.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process to implement the any portion of the functions/acts specified in the flowchart.

Furthermore, the respective block diagrams may illustrate parts of modules, segments or codes including at least one or more executable instructions for performing specific logic function(s). Moreover, it should be noted that the functions of the blocks may be performed in any suitable order. For example, two successive blocks may be performed substantially at the same time, or may be performed in reverse order according to their functions.

The term "module" according to the embodiments of the disclosure, means, but is not limited to, a software or hardware component, such as a Field Programmable Gate Array (FPGA) or Application Specific Integrated Circuit (ASIC), which performs certain tasks. A module may be configured to reside on the addressable storage medium and configured to be executed on one or more processors. Thus, a module may include components, such as software components, object-oriented software components, class components and task components, processes, functions, attributes, procedures, subroutines, segments of program code, drivers, firmware, microcode, circuitry, data, databases, data structures, tables, arrays, and variables, for example. The functionality provided for in the components and modules may be combined into fewer components and modules or further separated into additional components and modules. In addition, the components and modules may be implemented such that they execute one or more processors in a device or a secure multimedia card.

According to an embodiment of the present disclosure, a User Equipment (UE) can estimate channels from a Base Station (BS) and provide feedback of at least one of channel information (e.g., Channel Quality Information (CQI)) and Channel Direction Information to the BS. The BS may perform at least one of a channel precoder design, a modulation order determination, and a user selection based on the received channel information. If suitable, the UE may generate the feedback information considering the channel value and, in response, the BS may perform at least one of a channel precoding, a modulation order determination, and a user selection based on the channel information.

The embodiments of the present disclosure are to be regarded in an illustrative rather than restrictive in order to help understand the present disclosure. It is obvious to those skilled in the art that the present disclosure is applicable to other radio communication systems with appropriate modifications and changes without departing from the broader spirit and scope of the disclosure.

The Multiple-Input Multiple-Output (MIMO) technology is used in the various radio communication systems to increase system throughput and enhance link reliability. The recent radio communication systems such as Long Term Evolution (LTE) support multiuser communication based on the multiple antennas of the BS and UE. This makes it possible to transmit information to multiple UEs over the same frequency-time resource. In order to support the multiuser transmission effectively, it is necessary to control the inter-user interference. The BS or the UE controls interference using the channel information such that the communication performance is likely to be determined depending on the accuracy of the channel information.

For example, imperfect channel information at the BS results in inter-user interference and failure in achieving the full multiplexing gain.

The BS can obtain relatively accurate channel information in a Time Division Duplex (TDD) system in which uplink and downlink channels are reciprocal. In a Frequency Division Duplex (FDD) system having no such channel characteristics, the UE estimates the downlink channel from the BS and transmits the estimated channel information to the BS.

The imperfection (i.e., error) in at least one of the channel estimation, the time-varying channel, and the limitation of feedback channel causes imperfect channel information at the BS. Those imperfections are likely to degrade the performance of the multiuser communication. That is, if the precoding or user selection is performed when the channel information is erroneous, this results in failed interference control and causes performance degradation of the multiuser communication system.

According to an embodiment of the present disclosure, the UE is capable of estimating the channel from the BS and transmitting the channel estimation error predicted based on the measured channel. In an embodiment of the present disclosure, the channel estimation error may include a stochastic distribution. The BS is capable of predicting a time-varying channel error, a channel estimation error, a channel information quantization error, and a channel feedback error by performing at least one of an erroneous stochastic channel precoding design and a stochastic user selection based on the channel estimation error that is transmitted from the UE, thereby maximizing the system throughput. The BS is capable of performing the user selection based on the channel estimation error information.

1. Channel Estimation Error Information-Based Multiuser Channel Precoding Scheme A description is made of the system model considered in the present disclosure and the channel estimation error-based multiuser channel precoding scheme.

1.1 System Model

FIG. 1 is a diagram illustrating a system model of a radio communication system according to an embodiment of the present disclosure.

Referring to FIG. 1, the BS 100 and the UEs 110 and 120 may communicate signals. According to an embodiment of the present disclosure, the BS 100 includes a transceiver having M transmit antennas 104 and a control unit 102 for controlling the operation of the BS 100 and performing precoding and user selection.

According to an embodiment, the first UE 110 includes a transceiver having $N_1$ antennas 112 and a control unit for controlling the operation of the first UE 110. The $K^{th}$ UE 120 includes a transceiver having $N_K$ antennas 122 and a control unit for controlling the operation of the $K^{th}$ UE 120.

According to an embodiment, the BS 100 may processes the information 106 and transmit the processed information to the UEs 110 and 112 as denoted by reference number 108.

In the multiuser multi-antenna downlink M×N MIMO system according to the embodiment of FIG. 1, $N=\Sigma_{k=1}^{K} N_k$ and $N_k$ denotes the $k^{th}$ UE. In this embodiment, each UE may receive $L_k$ data streams ($L_k \leq N_k$). Assuming the received signal vector at the $K^{th}$ UE is $y_k$, the total received signal vector is $y=[y_1^T y_2^T \ldots y_K^T]^T$.

$$y = HPs + w \qquad \text{Equation (1)}$$

$$y_k = H_k P_k s_k + H_k \sum_{j \neq k} P_j s_j + w_k \qquad \text{Equation (2)}$$

In Equations (1) and (2), $P=[P_1 P_2 \ldots P_K]$, $P_k$ denotes channel precoding for the kIl UE, the precoded data Ps satisfies the total transmit power constraint as $tr(Pss^H P^H)=tr(PP^H) \leq P_{TX}$, $s=[s_1^T s_2^T \ldots s_K^T]^T$ where $P_{TX}$ denotes the total downlink transmit power at the BS, $s=[s_1^T s_2^T \ldots s_K^T]^T$ denotes the transmit data where $s_k$ is the transmit data vector of the $k^{th}$ UE, and $w=[w_1^T w_2^T \ldots w_K^T]^T$ denotes the noise vector where wk is the noise vector of the $k^{th}$ UE. It is assumed that the noise at each receive antenna has Gaussian distribution with zero mean and variance $\sigma_w^2$. $H=[H_1^T H_2^T \ldots H_K^T]^T$ denotes the channel matrix where $H_k$ is the channel matrix of the kIl UE.

1.2 Stochastic Channel Precoding

The thesis of H. Sung, S. Lee, and I. Lee, "Generalized Channel Inversion Methods for Multiuser MIMO Systems," IEEE Trans. Commun., vol. 57, pp. 3489-3499, November 2009 introduces a deterministic channel precoding. The present disclosure proposes a stochastic channel precoding scheme based on the stochastic methodology. In this embodiment, the stochastic precoder of the $k^{th}$ er can be obtained as follows.

$$P_k = (R+\alpha I)^{-1} M_k^H F_k \qquad \text{Equation (3)}$$

In Equation (3), $\alpha = N\sigma_w^2/P_{TX}$, $R=E[\hat{H}^H \hat{H} | \hat{H}]$, $M_k = E[H_k | \hat{H}_k]$, and $\hat{H}$ denotes the estimated CSI at the BS. $F_k$ is obtained from the Singular-Value Decomposition (SVD) of $(R+\alpha I)^{-1} M_k^H$. In this embodiment, 'I' denotes the unitary matrix corresponding to the order of the channel.

Further, $h_k$ denotes a vector formed by stacking columns of the channel matrix $H_k$ and is expressed as $h_k=\text{vec}(H_k)$. Moreover, denotes the channel estimation error matrix of the $k^{th}$ UE, and E denotes the channel estimation error matrix of the total UEs for $\hat{H}_k=H_k+E_k$ and has a relationship of $\hat{H}=H+E$. The channel matrix H and channel estimation error matrix E are independent and, respectively, modeled as Gaussian matrices CN (0, $Q_h$) and CN (0, $Q_e$). Then, R and $M_k$ of equation (3) can be deduced from the following relationship. In this embodiment, the UE can transmit the variance of the channel estimation error matrix to the BS.

$$E[h|\hat{h}] = (I+Q_e Q_h^{-1})^{-1} \hat{h} \qquad \text{Equation (4)}$$

$$E[hh^H|\hat{h}] = (I+Q_e Q_h^{-1})^{-1} Q_e + E[h|\hat{h}] E[h^H|\hat{h}] \qquad \text{Equation (5)}$$

In Equations (4) and (5), h=vec (H) and $\hat{h}$=vec ($\hat{H}$).

In this embodiment, when the transmit layer of each user is different from the number of the channel rank, it is necessary to choose a precoding matrix adaptively. In the present disclosure, SVD operation may be considered.

In Equations (4) and (5), $Q_h$ and $Q_E$ denotes the variances of the respective distributions and the BS can obtain these values based on the channel estimation error information transmitted from the UE.

Since the rank of the $k^{th}$ UE $L_k$ is equal to or less than the number of receive antennas $N_k$, it is necessary to perform the rank optimization at the receiver. Defining $B_k=(R+\alpha I)^{-1}M_k^H$, the achievable rate of the $k^{th}$ user may be approximated by $\log(\det(I+\rho F_k F_k^H))\approx\log(\det(\rho F_k F_k^H))$ at the higher Signal-to-Noise Ratio (SNR). In order to maximize this, $F_k$ is described as the following equation.

$$F_k = F_{gen}(L_k, V_k D_k^{-1})\qquad\text{Equation (6)}$$

In Equation (6), $V_k D_k^{-1}$ is obtained from SVD like $B_k^H B_k = V_k D_k^2 V_k^H$ and uses the function defined as follows.

$$F_{gen}(L,A)=[a_{f(1)}a_{f(2)}\ldots a_{f(L)}]\qquad\text{Equation (7)}$$

In this embodiment, $a_L$ denotes $L^{th}$ column vector of A, $f(1)$ represents the ordering of column vectors such that $\|a_{f(m)}\|\geq\|a_{f(n)}\|$ is satisfied in Equation (7).

2. Channel Estimation Error Feedback Scheme

A description is made of the procedure for the UE to transmit the information for use in designing a precoder at the BS as described above.

Typically, the Channel State Information (CSI) includes at least one of a Channel Quality Indicator (CQI) and a Channel Direction Indicator (CDI). The CQI indicates Signal-to-Interference-plus Noise Ratio (SINR) at the UE, and the CDI indicates the orientation degree of the channel matrix $H_k$. In more detail, the CDI may be a unit-norm vector/matrix which describes the orientation of the channel.

In order to reduce the quantization errors and minimize the feedback amount, quantization prediction and partial CDI feedback can be considered in the present disclosure. For example, the BS can perform the stochastic transmission method as described above based on the variance information of the quantization error from the UE. In an embodiment of the present disclosure, the variance information of the quantization error may include the variance information of the quantization errors of the channel matrix and estimation error matrix.

Moreover, if $H_k$ is correlated over time and antenna selection, the optimum channel coding set (codebook) based on the quantization of $H_k$ varies according to a correlation function. However, since the estimation error information $E_k$ in the present disclosure is uncorrelated, it is not necessary to change the channel coding matrix set (codebook) according to the correlation function.

Figure 2:
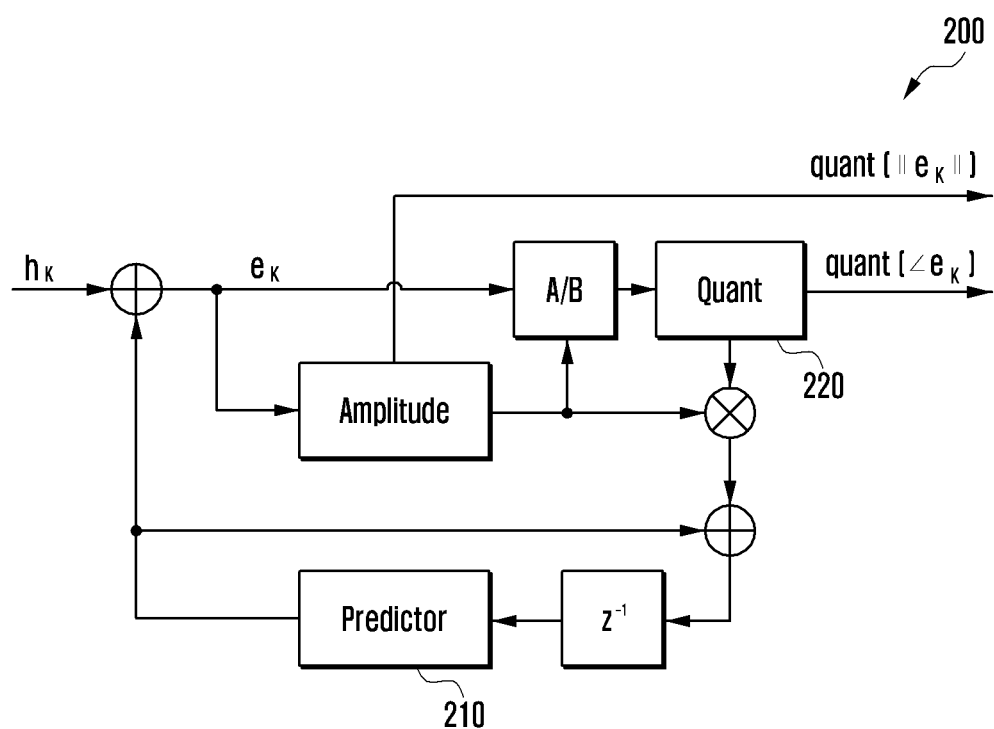
FIG. 2 is a diagram illustrating flow of a User Equipment (UE) channel quantization unit according to an embodiment of the present disclosure.
Figure 3:
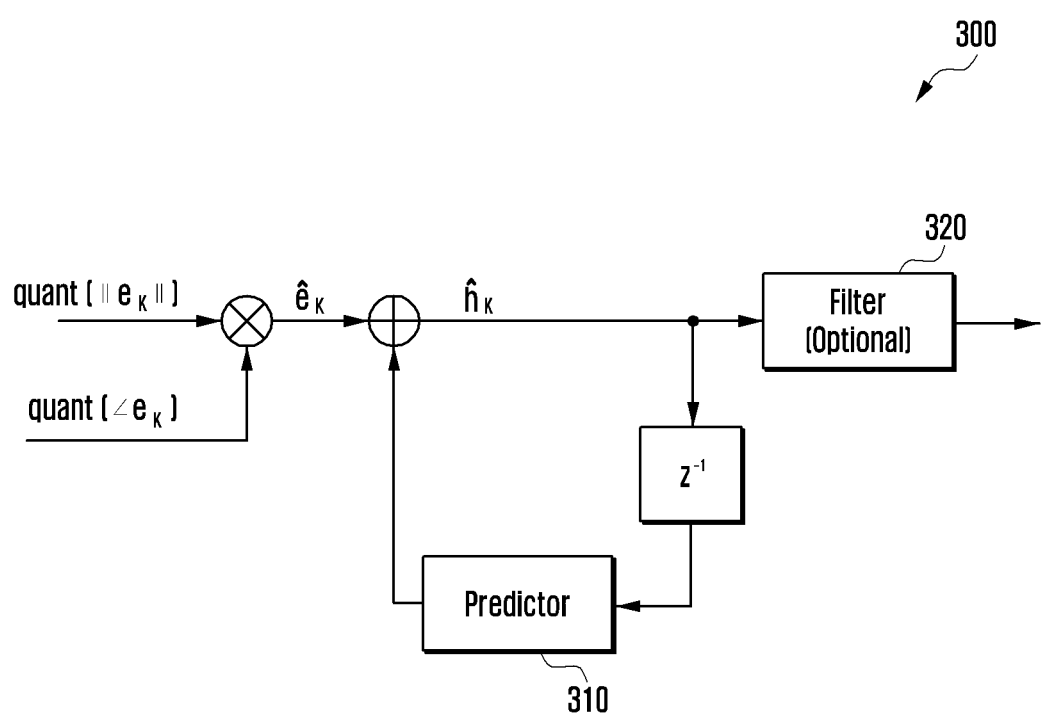
FIG. 3 is a diagram illustrating flow of a Base Station (BS) channel demodulator according to an embodiment of the present disclosure.

FIG. 2 is a diagram illustrating flow of a UE channel quantizer according to an embodiment of the present disclosure and FIG. 3 is a diagram illustrating flow of a BS channel demodulator according to an embodiment of the present disclosure.

Referring to FIGS. 2 and 3, the kth user predictive quantization procedures at the UE and the BS is illustrated schematically. Specifically, the UE 200 of FIG. 2 omits transmission of the feedback information on the channel matrix $H_k$ to the BS 300. Instead, the UE 200 transmits the quantization error information on as the channel estimation error information to the BS 300. The BS 300 also can predict the channel $\hat{h}_k$ based on received information (i.e., $e_k$). In another embodiment, it is also possible to transmit the channel estimation error size and orientation information. In more detail, the size and orientation information may be quantized as feedback, and the quantization scheme may be determined differently depending on the embodiment.

In another embodiment, the UE 200 may not expressly transmit CQI to the BS 300. Rather, the BS 300 can generate a CQI based on the channel information $\hat{h}_k$. In other words, CQI can be implicitly fed back by quant ($\|e_k\|$) and quant ($\angle e_k$). In an embodiment, $e_k=\text{vec}(E_k)$, and quant(·) is a quantization function.

According to an embodiment, the UE 200 may include at least one of a predictor 210 and quantizer 220. The quantizer 220 may quantize the channel information. The predictor 210 may predict channel estimation error. By operation of the predictor 210 and the quantizer 220, it is possible to obtain the quantization value of channel estimation error. According to an embodiment, the UE 200 transmits quant ($\|e_k\|$) and quant($\angle e_k$) to the BS 300 as feedback information.

Referring to FIG. 3, the BS 300 includes a predictor 310 and, selectively, a filter 320 for receiving signals. The predictor 310 of the BS 300 may operate similar to the predictor 210 of the UE 200. The BS 300 includes a first deducing unit (not shown) for deducing the channel estimation error based on the channel information transmitted from the UE, a second deducing unit (not shown) for deducing the stochastic precoder based on the channel estimation error, a selector (not shown) for perform stochastic user selection based on the precoder, an adjuster (not shown) for adjusting transmission rank per user in the course of the stochastic user selection procedure, and a transmitter (not shown) for transmitting signals according to the stochastic transmission method.

It is possible to dramatically reduce the amount of feedback information transmitted from the UE using the partial CDI. The proposed CDI configuration method is exemplified in the form of a pseudo code as shown in table 1. In table 1, $B_2$ denotes a number of bits allocated for CDI feedback and satisfies $MN_k = T_{CDI} \cdot (B_2/2)$. In an embodiment, $B_2$ is an even integer, and $h_k$ is an n-length vector. $T_{CDI}$ is an integer, and $e_k$ is the $k^{th}$ element of e. The value of $\Delta$ can be selected differently depending on the embodiment but greater than 0 and less than 1. The CDI feedback amount carried in every subframe can be adjusted effectively by adjusting the variable $T_{CDI}$ along with other additional effects. For example, the BS is capable of adjust the CSI-RS transmission interval to save downlink resource. In more detail, the partial CDI update is capable of reducing the number of reference signals per subframe. This is possible because the BS does not need to send CSI-RS on the antenna ports, which is not updated at the corresponding subframe. Moreover, the proposed pseudo code exemplified in table 1 does not need of complex number multiplication operation unlike the related-art quantization method. The feedback method according to this embodiment is capable of reducing operation complexity. In an embodiment, the operation of table 1 can be performed by the deducing unit of the UE.

TABLE 1

Algorithm 1 Pseudo code for the partial CDI update

1: Base CD1 candidate set: C = {Δ, Δj, −Δ, −Δj}
2: At kth subframe,
3:  l = mod(k, $T_{CDI}$)
4:  for i = {1, 2, ..., $B_2$/2}
5:   if $|\Re[e_{l+i}]| \geq |\Im[e_{l+i}]|$ TABLE 1-continued Algorithm 1 Pseudo code for the partial CDI update

```
6:        qi = argmin (|ℜ[e_{I+i}] − ℜ[x]|)
              x∈{Δ,−Δ}
7:     else
8:        qi = argmin (|ℑ[e_{I+i}] − ℑ[x]|)
              x∈{Δj,−Δj}
9:     end
10:    transmits the index of [q1, q2, ..., qB_2/2] as CDI
```

As described above, it is possible to configure the partial CDI differently depending on the feedback information amount.

Figure 4:
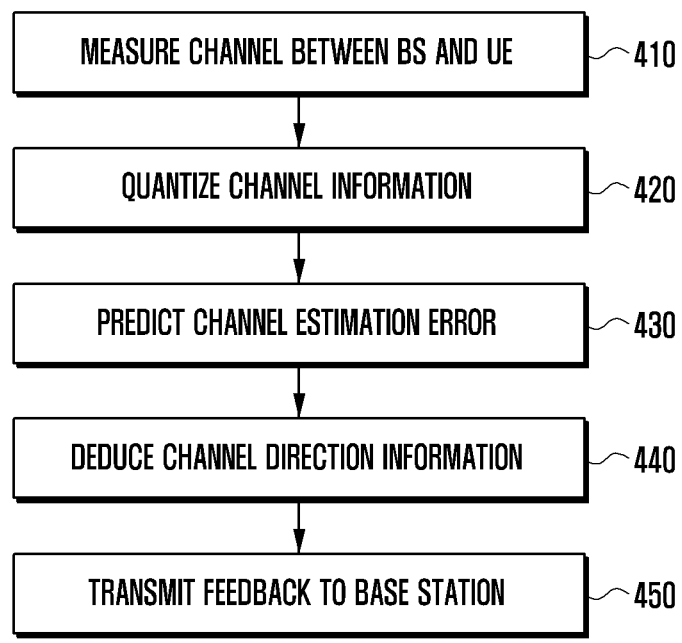
FIG. 4 is a flowchart illustrating the channel estimation error prediction-based channel information feedback procedure of the UE according to an embodiment of the present disclosure.

FIG. 4 is a flowchart illustrating the channel estimation error prediction-based channel information feedback procedure of the UE according to an embodiment of the present disclosure.

Referring to FIG. 4, the UE transmits and receives signals to and from the BS.

Specifically, at operation 410, the UE estimates a channel between the BS and the UE. In more detail, the UE is capable of measuring channel information based on the reference signal transmitted by the BS. The reference signal can be measured variously depending on the communication system.

The UE quantizes the channel information at operation 420. The channel information can be quantized via any suitable procedure. For example, the channel information quantization can be performed by determining a precoding vector most similar to the channel based on a preset codebook information. The channel quantization also can be performed by determining the index corresponding to the channel information in a codebook, which can indicate previous channel information instead of the precoding vector.

The UE predicts (i.e., calculates) a channel estimation error at operation 430. In more detail, the UE is capable of predicting the channel estimation error based on the channel information and the channel quantization information via the predictor of the UE. According to an embodiment of the present disclosure, the channel estimation error may include the difference between the channel information estimated by the UE and the channel information quantized by the UE.

The UE deduces a channel direction based on at least one of the channel information, the channel quantization information, and the channel estimation error prediction information at operation 440. For example, the channel direction can be obtained using the pseudo code listed in table 1, and the partial channel direction information may be deduced according to the allocated information amount.

The UE transmits at least one of the channel estimation error prediction information and the channel direction information at operation 450. In more detail, the channel estimation error prediction information may include the channel estimation error size and direction information which is quantized to be fed back to the BS.

3. Channel Estimation Error Information-Based User Selection Scheme

A description is made of the channel estimation error-based user selection scheme for use in the multiuser radio communication system hereinafter.

Figure 5:
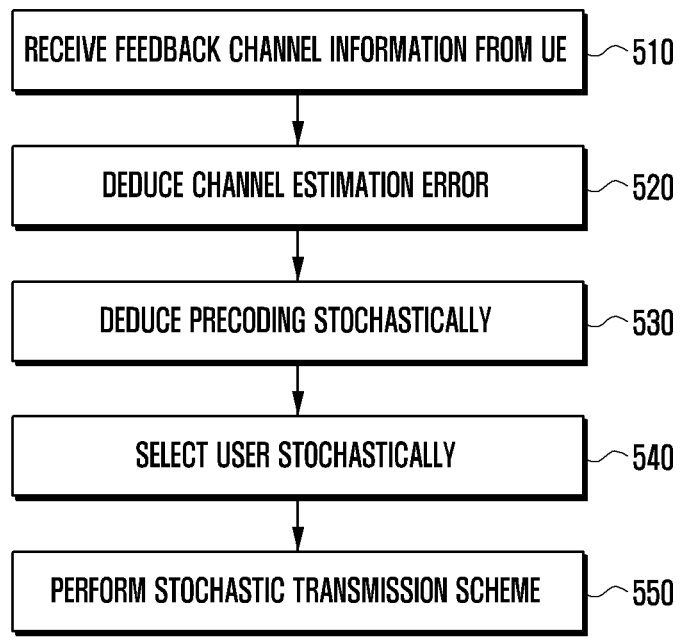
FIG. 5 is a flowchart illustrating the stochastic precoder design and stochastic user selection procedure of the BS based on the feedback channel information transmitted from the UE according to an embodiment of the present disclosure.

FIG. 5 is a flowchart illustrating the stochastic precoder design and stochastic user selection procedure of the BS based on the feedback channel information transmitted from the UE according to an embodiment of the present disclosure.

Referring to FIG. 5, the BS receives the feedback channel information transmitted from the UE at operation 510. The channel information may include at least one of the channel estimation error prediction information and the channel direction information. The channel estimation error prediction information may include the channel estimation error size and the direction information. At least one of the channel estimation error size and the direction information may be quantized by the UE prior to transmission.

The BS deduces (i.e., calculate) the channel estimation error from the received information at operation 520. This operation may be performed by the deducing unit of the BS. In more detail, the BS deduces the channel estimation error from the quantized information that is received from the UE.

The BS deduces (i.e., calculates) the stochastic precoder from the deduced information at operation 530. In more detail, the BS determines the precoder capable of maximizing the channel transmission capacity based on the deduced channel estimation error.

The BS selects users stochastically based on the deduced channel estimation error information and the deduced stochastic precoder at operation 540. In an embodiment, since the achievable rate is dependent on the selected UEs, selects users capable of maximizing the achievable rate based on the information fed back by the UEs.

The BS performs signal transmission to the selected UEs using the deduced stochastic precoder at operation 550.

The received vector at the $k^{th}$ UE is given as following equation:

$$y_k = H_{eq(k,k)}s_k + \sum_{j \neq k} H_{eq(k,j)}s_j + w_k \quad \text{Equation (8)}$$

In Equation (8), $H_{eq(k,j)} = H_k P_j$.

If a whitening filter $T_k^{-1/2}$ is applied at the receiver, where $T_k = \sum_{j \neq k} H_{eq(k,j)} + \sigma_w^2 I$, then the output is $\tilde{y}_k = \tilde{H}_{eq(k,k)}s_k + \tilde{w}_k$, where $\tilde{H}_{eq(k,k)}$ is $T_k^{-1/2} H_{eq(k,k)}$. If the whitening filter is applied to the received vector, the achievable rate of the $k^{th}$ user is given as following equation.

$$R_k(S) = \log_2(det(I + \tilde{H}_{eq(k,k)}\tilde{H}_{eq(k,k)})) \quad \text{Equation (9)}$$

In Equation (9), $\tilde{H}_{eq(k,k)} = T_k^{-1/2} H_{eq(k,k)}$, and S denotes the selected UE.

However, because the precoder $P_j$ given in equation (3) is dependent on the selected user set, the achievable rate is dependent on the selected user set as shown in equation (9). Therefore, the sum rate $R(S) = \sum_{k \in S} R_k(S)$ depends on the user selection.

Table 2 illustrates a pseudo code of the operation flow of selecting users based on equation (9). Typically, the BS does not have perfect information on the downlink channel $H_k$. Therefore, in the related-art deterministic approach, it is possible to obtain $\tilde{H}_{eq(k,k)}$ of equation (9) using the feedback channel information $\hat{H}_k$ instead of the downlink channel $H_k$.

$$\tilde{H}_{k,k}^{det} = (\hat{T}_k^{det})^{-1/2} \hat{H}_{k,k}^{det} \quad \text{Equation (10)}$$

In Equation (10), $$\hat{H}_{k,k}^{det} = \hat{H}_k P_k$$

and $$\hat{T}_k^{det} = \sum_{j \neq k} \hat{H}_{k,k}^{det} \hat{H}_{k,k}^{det\,H} + \sigma_w^2 I$$

are used.

Here, $\tilde{H}_{k,k}^{det}$ can be obtained from

TABLE 2

Algorithm 2 Conventional greedy user selection algorithm

```
 1: Initialize S = ∅, R̂(S) = 0, end TempVal = 0.
 2: for k ∈ {1, 2, ... , K}\S do
 3:     Calculate R(S ∪ {k}).
 4:     (Note that the base station chooses the best number of
    streams L_j for the calculation of R̂_j(S ∪ {k}).)
 5:     (Find k* maximizing R̂_j(S ∪ {k}))
 6:     if R̂_j(S ∪ {k}) > TempVal then
 7:         k* = k
 8:         TempVal = R̂_j(S ∪ {k})
 9:     end if
10: end for
11: if R̂_j(S ∪ {k*}) ≥ R̂_j(S) then
12:     S ← S ∪ {k*}
13:     go to 2
14: end if
```

In the above example stochastic user selection method, $\tilde{H}_{eq(k,k)}$ of equation (9) is obtained using the channel estimation error information $E_k$. For example, $\tilde{H}_{eq(k,k)}$ is obtained as shown in equation (11).

$$\tilde{H}_{k,k}^{sto} = (\hat{T}_k^{sto})^{-1/2} \hat{H}_{k,k}^{sto} \quad \text{Equation (11)}$$

In Equation (10), $$\hat{H}_{k,k}^{sto} = (\hat{H}_k - E_k) P_k;$$

and $$\hat{T}_k^{sto} = \sum_{j \neq k} \hat{H}_{k,k}^{sto} \hat{H}_{k,k}^{stoH} + \sigma_w^2 I + \left(\sigma_{e,k}^2 \sum_{j \neq k} P_{TX_j}\right) I$$

are used. $\sigma_{e,k}^2$ of Equation (11) can be obtained using the channel estimation error feedback information.

Accordingly, the transmission rate achievable through the stochastic transmission scheme as shown in equations (9) and (11) can be expressed as follows:

$$\hat{R}_k^{sto}(S) = \log_2\left(\det\left(I + \tilde{H}_{k,k}^{sto} \tilde{H}_{k,k}^{stoH}\right)\right) \quad \text{Equation (12)}$$

$$\hat{R}^{sto}(S) = \sum_{k \in S} \hat{R}_k^{sto}(S) \quad \text{Equation (13)}$$

4. Simulation Result

In order to evaluate the efficiency of the method proposed in various embodiments of the present disclosure, the proposed stochastic transmission/reception method is assessed by comparing simulations with the related-art deterministic transmission/reception methods. Table 3 shows the assumptions for the simulation.

TABLE 3

| Parameters | Values |
| --- | --- |
| (M, K, N_k) | (8, 4, 2) MIMO system |
| Channel | Frequency flat Rayleigh fading channel |
| Doppler | 0 Hz, 3 Hz, 10 Hz, 20 Hz, 30 Hz |
| CSI feedback | 4 bits amplitude quantization and 8 bits CDI quantization per 1 ms |
| Δ value for partial CDI update | 0.5 |
| CSI feedback delay | 4 ms |
| Antenna correlation | Low ($\alpha = 0$), medium ($\alpha = 0.3$), and high ($\alpha = 0.9$) transmit correlation and low receive correlation baseed on 3GPP TS36.101 (i.e. spatial correlation using cross polarized antennas) |

Through the simulation, the performance comparison is made under the channel error caused by channel variation due to the Doppler effect and channel information error caused by quantization.

Figure 6:
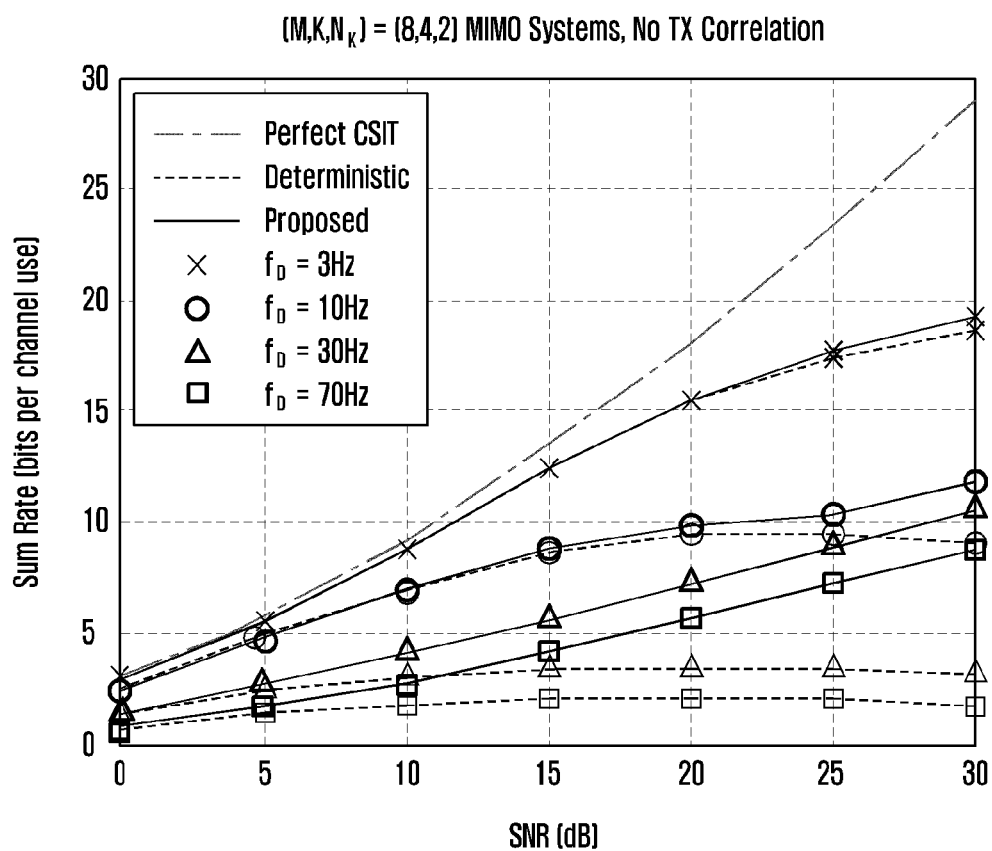
FIG. 6 is a graph illustrating performances of the proposed stochastic transmission/reception methods and related-art deterministic transmission/reception methods in the time varying channel environment according to an embodiment of the present disclosure.
Figure 7:
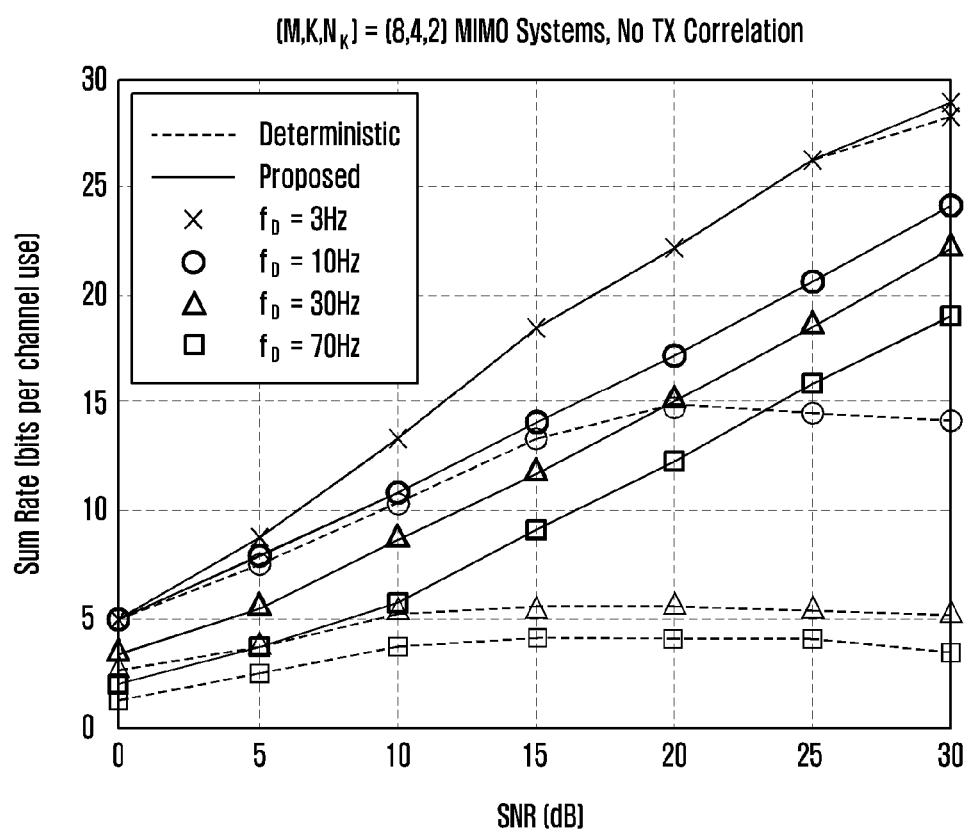
FIG. 7 is a graph illustrating performances of the proposed stochastic transmission/reception methods and related-art deterministic transmission/reception methods in the time-correlated channel varying environment according to an embodiment of the present disclosure.

FIG. 6 is a graph illustrating performances of the proposed stochastic transmission/reception methods and related-art deterministic transmission/reception methods in the time varying channel environment according to an embodiment of the present disclosure, and FIG. 7 is a graph illustrating performances of the proposed stochastic transmission/reception methods and related-art deterministic transmission/reception methods in the time-correlated channel varying environment according to an embodiment of the present disclosure.

Referring to FIG. 6, the performance comparison between the proposed methods and the related-art methods is illustrated. In FIG. 6, it is assumed that the antennas are not correlated there between. The solid lines show the transmission rate achievable through the stochastic transmission/reception methods, and the dashed lines show the transmission rate achievable through the related-art deterministic transmission/reception methods. The alternated long and short dash line shows ideal peak transmission rate under the assumption of the perfect channel information at the BS. As shown in FIG. 6, as the Doppler effect increases (i.e., the channel information error at the BS increases), the performance gap between the proposed stochastic method and the related-art deterministic method increases. Referring to FIG. 7, it is assumed that the antennas are correlated there between. As shown in FIG. 7, the proposed method shows enhanced performance with the efficient user of the correlation as compared to the related-art method.

Referring to FIGS. 6 and 7, the stochastic transmission/reception method is capable of improving the performance as compared to the related-art deterministic methods.

5. Conclusion

The present disclosure relates to stochastic transmission/reception methods and apparatus for use in the multiple antenna multiuser radio communication system. The stochastic transmission/reception method includes a channel estimation error prediction procedure, stochastic precoding determination procedure, and stochastic user selection procedure. There is no need of changing the codebook through quantization prediction-based CDI feedback depending on the channel condition and no need of complex number multiplication operation. As illustrated in FIGS. 6 and 7, the proposed stochastic transmission/reception method is capable of improving performance over the related-art deterministic method.

According to an embodiment of the present disclosure, the operation of the estimator of the UE for obtaining the link channel information from the base station in the radio communication system may include quantizing the channel measured by the UE, predicting the channel estimation error through the quantization procedure, and deducing the channel direction information for feedback of the channel estimation error.

According to another embodiment of the present disclosure, the UE includes an estimator for obtaining the link channel from the base station and may include a quantization unit for quantizing the estimated channel, a prediction unit for predicting the channel estimation error through the quantization procedure, a deduction unit for deducing the channel direction information for feedback of the channel estimation error, and a transmission unit for transmitting of the feedback channel direction information to the BS.

According to another embodiment of the present disclosure, a method of a base station which is performed based on the feedback channel information transmitted from the UE includes deducing the channel estimation error from the feedback channel information, deducing the stochastic precoder from the channel estimation error, stochastically selecting users based on the precoder, adjusting a transmission rank per user during the stochastic user selection process, and transmitting information through the stochastic transmission scheme.

According to another embodiment of the present disclosure, a stochastic precoder design and stochastic user selection apparatus using the feedback channel information from UEs includes a first deducing unit which deduces channel estimation error from the feedback channel information, a second deducing unit which stochastically deduces a precoder from the channel measurement error, a selector which stochastically selects users based on the precoder, an adjustment unit which adjusts a transmission rank per user during the stochastic user selection process, and a transmitter which transmits signals using the stochastic transmission method.

As described above, the present disclosure is advantageous in terms of maximizing the system throughput by predicting the time-varying channel error, channel estimation error, channel information quantization error, and channel feedback error in such a way that the UE estimates a channel from the BS and transmits feedback channel estimation error that is predicted based on the estimated channel. The BS receives the feedback channel estimation error and performs stochastic channel precoding and stochastic user selection based on the channel estimation error.

Although the description has been made with reference to particular embodiments, the present disclosure can be implemented with various modifications without departing from the scope of the present disclosure. Thus, the present disclosure is not limited to the particular embodiments disclosed but will include the following claims and their equivalents.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of transmitting and receiving signals by a terminal in a mobile communication system, the method comprising:
   receiving, from a base station, at least one reference signal;
   identifying information on a channel based on the at least one reference signal, the information on the channel comprising information on a direction of the channel;
   predicting a channel estimation error based on the information on the channel, the channel estimation error comprising a direction information of the channel estimation error;
   generating feedback information based on the channel estimation error; and
   transmitting the feedback information to the base station,
   wherein the feedback information is updated based on the channel estimation error and a number of information bits allocated for the feedback information, and
   wherein a period related to the at least one reference signal is identified based on the number of information bits allocated for the feedback information.

2. The method of claim 1, wherein the predicting of the channel estimation error comprises:
   quantizing the information on the channel based on pre-configured information; and
   predicting the channel estimation error based on the quantized channel estimation information and the identified information on the channel.

3. The method of claim 1, wherein the generating of the feedback information comprises:
   quantizing size and direction information of the channel estimation error; and
   transmitting the quantized size and direction information to the base station.

4. The method of claim 1, wherein the direction of the channel comprises quantized direction information of the identified channel.

5. The method of claim 1, further comprising receiving a signal from the base station, the signal comprising a precoding scheme determined based on the feedback information.

6. A method of transmitting and receiving signals by a base station in a mobile communication system, the method comprising:
   transmitting at least one reference signal to a terminal; and
   receiving feedback information generated based on the at least one reference signal from the terminal,
   wherein the feedback information is generated based on a channel estimation error, the channel estimation error comprising a direction information of the channel estimation error,
   wherein the channel estimation error is predicted based on information on the channel identified based on the at least one reference signal, the information on the channel comprising information on a direction of the channel,
   wherein the feedback information is updated based on the channel estimation error and a number of information bits allocated for the feedback information, and
   wherein a period related to the at least one reference signal is identified based on the number of information bits allocated for the feedback information.

7. The method of claim 6, wherein the channel estimation error comprises information determined based on the channel estimation information and the identified information on the channel, the channel estimation information being obtained by quantizing the information on the channel identified based on the at least one reference signal.

8. The method of claim 6, wherein the feedback information further comprises a size of the quantized channel estimation error.

9. The method of claim 6, wherein the direction of the channel comprises a quantized direction of the channel.

10. The method of claim 6, further comprising:
selecting user terminals based on the feedback information;
determining a precoding scheme based on the feedback information; and
transmitting signals using the determined precoding scheme to the selected user terminals.

11. A terminal in a mobile communication system, the terminal comprising:
a memory configured to store instructions therein;
a transceiver configured to transmit and receive signals to and from a base station; and
at least one processor,
wherein, upon execution of the instructions, the at least one processor is configured to:
control the transceiver to receive at least one reference signal from the base station,
identify information on the channel based on the at least one reference signal, the information on the channel comprising information on a direction of the channel,
predict a channel estimation error based on the information on the channel, the channel estimation error comprising a direction information of the channel estimation error,
generate feedback information based on the channel estimation error, and
control the transceiver to transmit the feedback information to the base station,
wherein the feedback information is updated based on the channel estimation error and a number of information bits allocated for the feedback information, and
wherein a period related to the at least one reference signal is identified based on the number of information bits allocated for the feedback information.

12. The terminal of claim 11, wherein the at least one processor is further configured to:
quantize the information on the channel based on preconfigured information, and
predict the channel estimation error based on the quantized channel estimation information and the identified information on the channel.

13. The terminal of claim 11, wherein the at least one processor is further configured to:
quantize a size and the direction information of the channel estimation error, and
control the transceiver to transmit the quantized size and direction information to the base station.

14. The terminal of claim 11, wherein the feedback information further comprises direction information of the identified channel.

15. The terminal of claim 11, wherein the at least one processor is further configured to control the transceiver to receive a signal from the base station comprising a precoding scheme determined based on the feedback information.

16. A base station in a mobile communication system, the base station comprising:
a memory configured to store instructions therein;
a transceiver configured to transmit and receive signals to and from a terminal; and
at least one processor,
wherein, upon execution of the instructions, the at least one processor is configured to:
control the transceiver to transmit at least one reference signal to the terminal, and
receive feedback information generated based on the at least one reference signal from the terminal,
wherein the feedback information is generated based on a channel estimation error, the channel estimation error comprising a direction information of the channel estimation error,
wherein the channel estimation error is predicted based on information on the channel identified based on the at least one reference signal, the information on the channel comprising information on a direction of the channel,
wherein the feedback information is updated based on the channel estimation error and a number of information bits allocated for the feedback information, and
wherein a period related to the at least one reference signal is identified based on the number of information bits allocated for the feedback information.

17. The base station of claim 16, wherein the channel estimation error comprises information determined based on the channel estimation information and the identified information on the channel, the channel estimation information being obtained by quantizing the information on the channel identified based on the at least one reference signal.

18. The base station of claim 16, wherein the feedback information further comprises a size and direction information of the channel estimation error.

19. The base station of claim 16, wherein the feedback information comprises direction information on the identified channel.

20. The base station of claim 16, wherein the at least one processor is further configured to select user terminals based on the feedback information, determine a precoding scheme based on the feedback information, and control the transceiver to transmit signals using the determined precoding scheme to the selected user terminals.

* * * * *